US008130235B2

(12) United States Patent
Marcinkiewicz

(10) Patent No.: US 8,130,235 B2
(45) Date of Patent: Mar. 6, 2012

(54) APPARATUS AND METHOD OF AUTOMATICALLY ADJUSTING A DISPLAY EXPERIENCING VARYING LIGHTING CONDITIONS

(75) Inventor: Walter Marcinkiewicz, Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1304 days.

(21) Appl. No.: 11/306,171

(22) Filed: Dec. 19, 2005

(65) Prior Publication Data

US 2007/0139405 A1    Jun. 21, 2007

(51) Int. Cl.
G09G 5/02 (2006.01)
G09G 3/36 (2006.01)
G09G 5/10 (2006.01)

(52) U.S. Cl. ......... 345/590; 345/89; 345/102; 345/593; 345/690

(58) Field of Classification Search ................. 345/590, 345/593, 89, 102, 690
See application file for complete search history.

(56) References Cited

U.S. PATENT DOCUMENTS

| 5,459,678 | A | 10/1995 | Feasey |
| 6,094,185 | A * | 7/2000 | Shirriff ......................... 345/102 |
| 6,928,613 | B1 * | 8/2005 | Ishii et al. ..................... 715/726 |
| 2003/0122810 | A1 * | 7/2003 | Tsirkel et al. ................. 345/207 |
| 2003/0210221 | A1 * | 11/2003 | Aleksic ......................... 345/102 |
| 2004/0012556 | A1 | 1/2004 | Yong et al. |
| 2005/0151728 | A1 * | 7/2005 | Nenonen ....................... 345/204 |
| 2005/0168645 | A1 | 8/2005 | Yamazaki |
| 2005/0253866 | A1 * | 11/2005 | Kim et al. ..................... 345/594 |
| 2007/0183656 | A1 * | 8/2007 | Kuwahara et al. ............ 382/162 |

FOREIGN PATENT DOCUMENTS

| EP | 1361563 | 11/2003 |
| EP | 1542451 | 6/2005 |
| JP | 11136528 A | 5/1999 |
| JP | 2005253050 A | 9/2005 |
| WO | 03/083775 | 10/2003 |
| WO | 03083775 | 10/2003 |

OTHER PUBLICATIONS

"Color/Bit Depth and Image Resolution." Adobe. Dec. 31, 2002. Web. Dec. 4, 2009. <http://www.adobe.com/education/webtech/CS2/unit_graphics1/gb_res_bitdepth_id.htm>.*

(Continued)

Primary Examiner — Amr Awad
Assistant Examiner — Jonathan Boyd
(74) Attorney, Agent, or Firm — Sreenivas Vedantam; Moore & Van Allen, PLLC

(57) ABSTRACT

Disclosed is a means for adjusting color gamut data associated with a digital media file to compensate for changing ambient light conditions at a display screen. Ambient light conditions at the display screen are detected using a light sensor and converted into ambient light data. Alternate color gamut data is then selected according to the current ambient light data from a color gamut look-up table that contains optimized color gamut data for a variety of ambient light data associated with the digital media file. Display correction parameters are then determined based on the alternate color gamut data. The display correction parameters are applied to present a more optimal rendition of the digital media file. The light sensor periodically re-detects the ambient light conditions so that any changes can be re-processed to update a rendition of the digital media file as it is displayed.

20 Claims, 5 Drawing Sheets

OTHER PUBLICATIONS

Sony Ericsson Mobile Communications AB, International Application No. PCT/US06/032940, International Search Report, Jan. 22, 2007.

Sony Ericsson Mobile Communications AB, International Application No. PCT/US06/032940, Written Opinion, Jan. 22, 2007.

Sony Ericsson Mobile Communications AB, International Preliminary Report on Patentability, corresponding to International Patent Application No. PCT/US2006/032940 dated Mar. 5, 2008.

State Intellectual Property Office, P.R. China. First Office Action. Mar. 8, 2010. 9 pgs.

Japanese Patent Office; First Office Action; Aug. 23, 2011; issued in Japanese Patent Application No. 2008-545577.

* cited by examiner

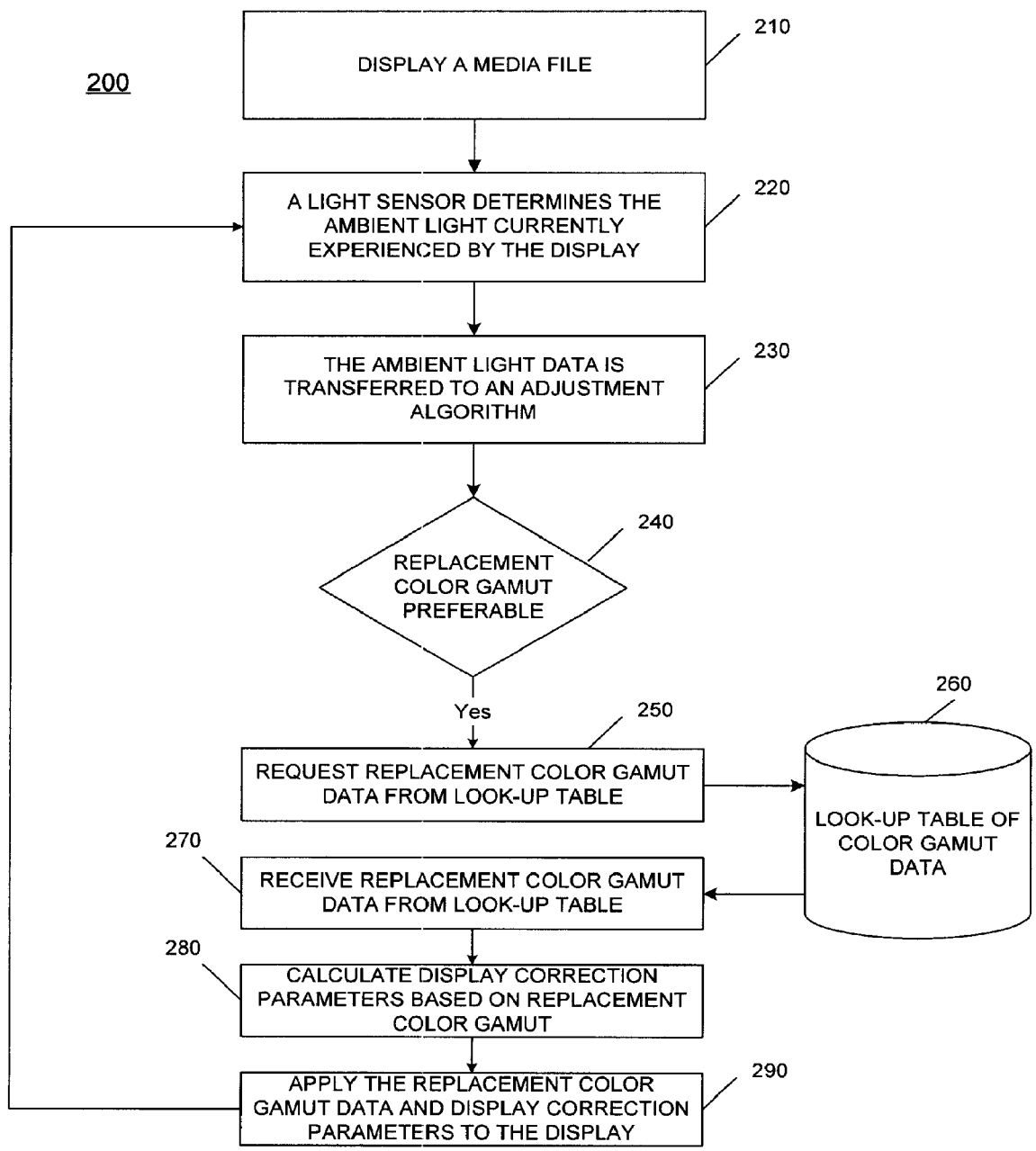

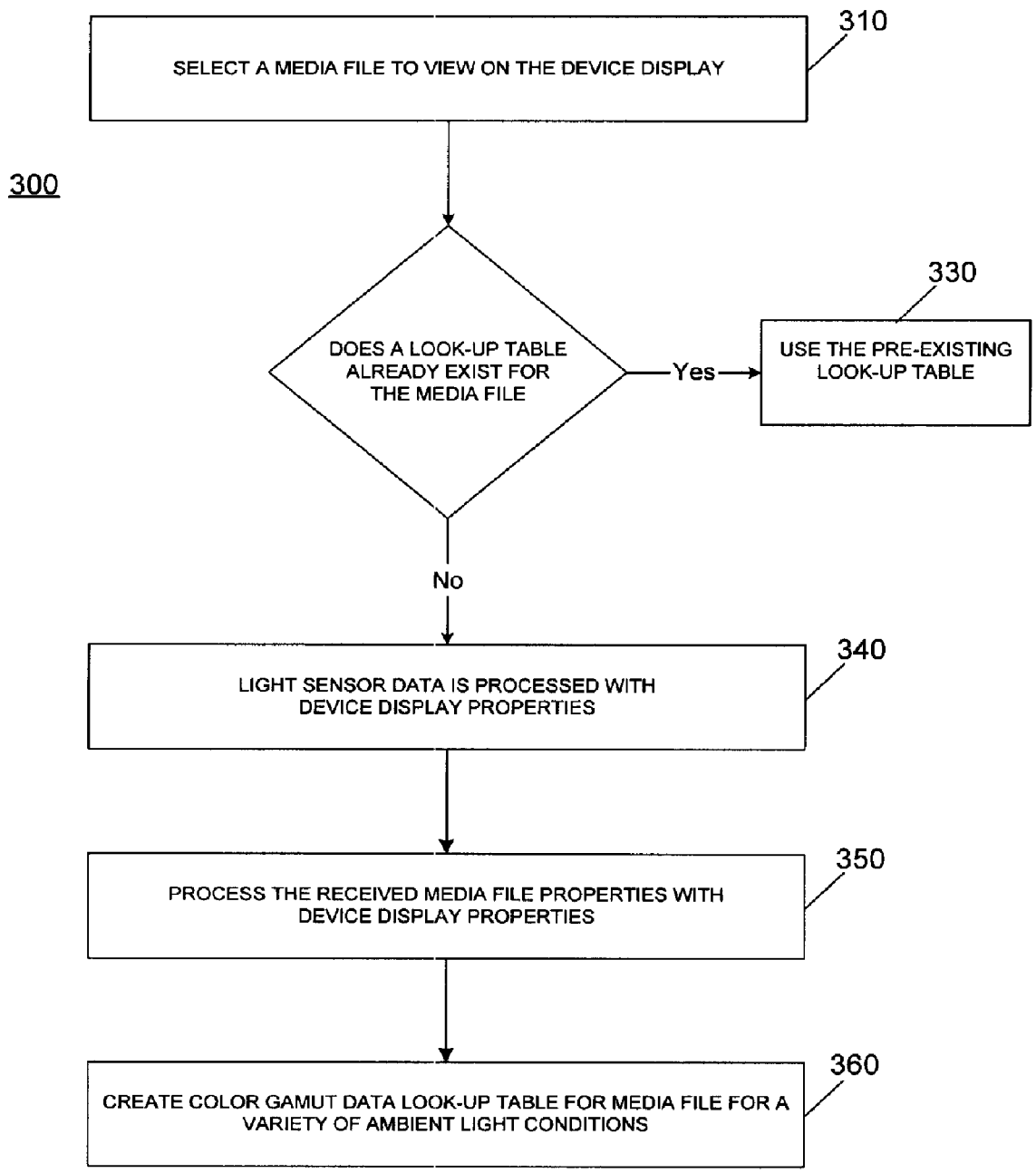

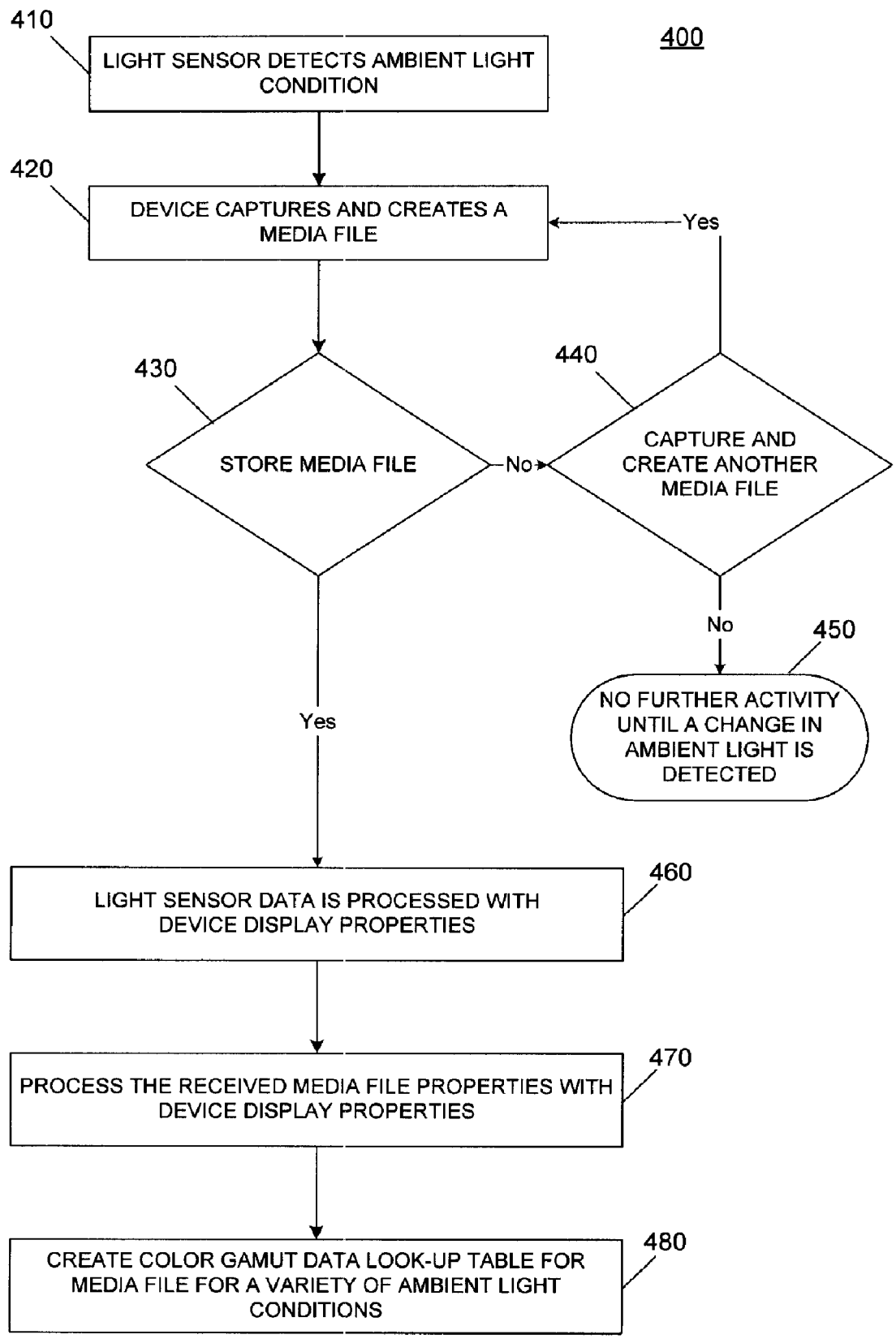

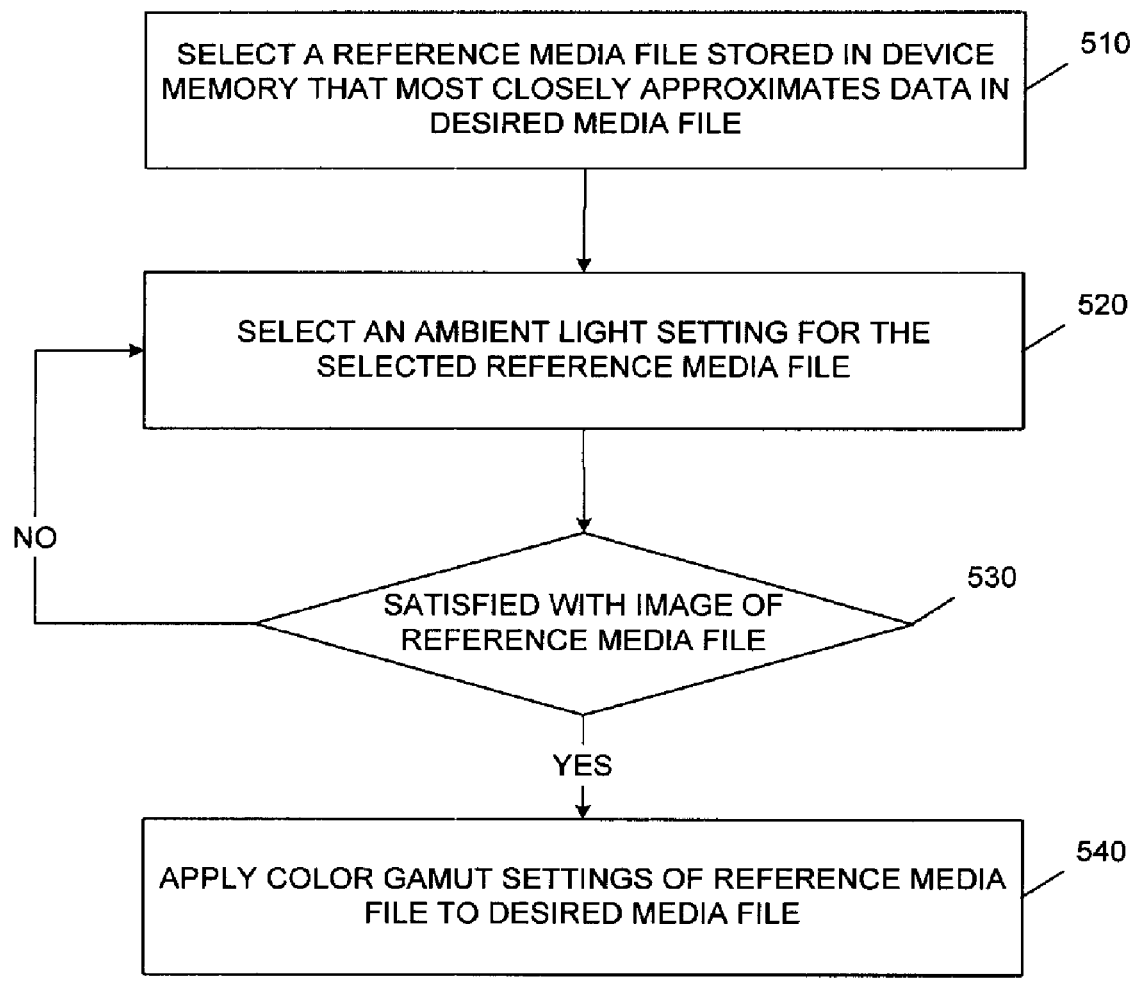

APPARATUS AND METHOD OF AUTOMATICALLY ADJUSTING A DISPLAY EXPERIENCING VARYING LIGHTING CONDITIONS

BACKGROUND

A chromacity diagram depicts the multiplicity of wavelengths within the color spectrum that are visible to the human eye. The color properties of these wavelengths include: hue (a particular gradation of color), saturation (vividness or intensity of the hue), and brightness (the hue's range from dimness to resplendence). A specific color may be correlated to one wavelength. However, there are a multiple combination of wavelengths that can produce the same color.

The richness of the images shown on a display is limited by the range of colors the display may emit. Within the chromacity diagram exists the range of colors that a display may emit. Cartesian coordinates may be used within the chromacity diagram to determine if a specific color can be emitted on a specific display. Typically, a specific color shown on a display is a combination of the wavelengths of the three primary colors (red, blue, and green). Color gamut refers to the range of color wavelengths that are viewable on a specific display under a specific ambient light. A particular color gamut may correspond to a well-lit environment, whereby another color gamut may correspond to a dimly-lit environment.

Ambient light data at the display is a significant factor in viewing an accurate rendition of an image on a display. For example, the color in a digital picture may appear to be blue and light grey, when viewed on a mobile phone display in a well-lit environment. However, the same colors may appear to be black and white, if viewed on the same mobile phone, but in a dimly-lit environment. Typically, to correct this problem the display's brightness control will be adjusted to make the picture brighter; however this may cause the picture to appear to be "washed out". As discussed above, there are multiple combinations of wavelengths which can form the same color. Therefore, by determining a different wavelength combination for the same color, a user may view an accurate rendition of the image under a different ambient light.

Currently, there is a not a means, (manual, automatic, or otherwise) for a user to adjust the color gamut on a display to correct for change in the ambient light experienced by the display. Thus, there is a need for an apparatus and method that can automatically adjust the display color gamut to reflect a change in the ambient light conditions experienced by a display.

SUMMARY

The present invention discloses a means for adjusting color gamut data associated with a digital media file to compensate for changing ambient light conditions at a display screen. Ambient light conditions at the display screen are detected using a light sensor and converted into ambient light data. Alternate color gamut data is then selected according to the current ambient light data from a color gamut look-up table that contains optimized color gamut data for a variety of ambient light data associated with the digital media file. Display correction parameters are then determined based on the alternate color gamut data. The display correction parameters are applied to present a more optimal rendition of the digital media file. The light sensor periodically re-detects the ambient light conditions so that any changes can be re-processed to update a rendition of the digital media file as it is displayed.

The present invention can be implemented as a computer program product embodied on a computer readable medium.

BRIEF DESCRIPTION OF THE DRAWINGS

FIG. 2 is a flowchart illustrating a method of automatically adjusting a display in accordance with an embodiment of the present invention.

FIG. 3 is a flowchart illustrating a method of creating a look-up table for a media file that was not created by the device associated with the display.

FIG. 4 is a flowchart illustrating a method of creating a look-up table for a media file created by the device associated with the display.

FIG. 5 is a flowchart illustrating a method of automatically adjusting a display in accordance with another embodiment of the present invention.

DETAILED DESCRIPTION

Figure 1:
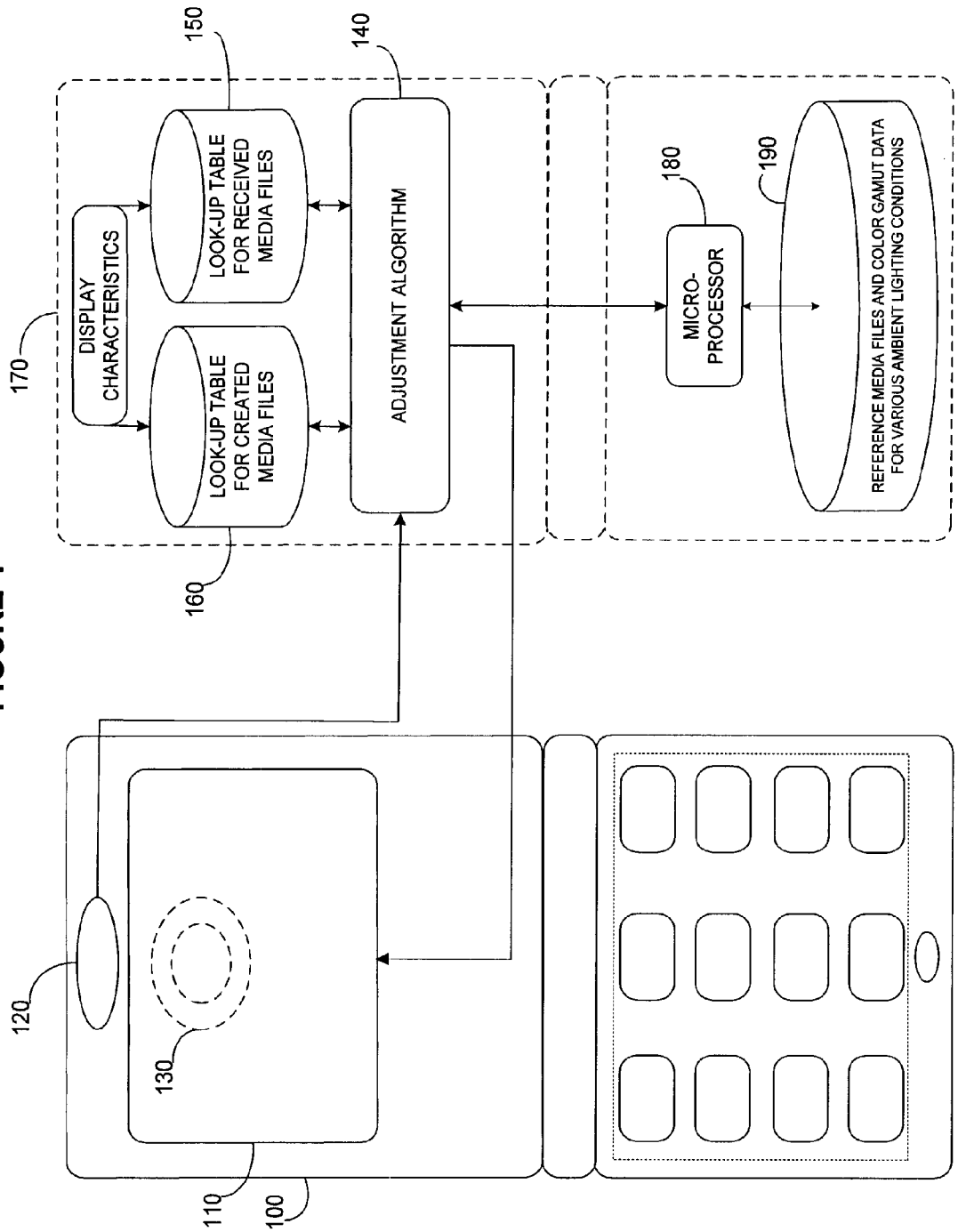
FIG. 1 is a block diagram illustration of the environment in which the present invention operates.

The term media file as used herein includes digital picture and digital video files that are viewable on a display.

The present invention uses a light sensor to monitor ambient light at the display. The light sensor forwards the ambient light data to an adjustment algorithm, which runs in the background and determines whether a replacement color gamut is preferable. If a replacement color gamut is preferable, the adjustment algorithm will automatically generate and apply the replacement color gamut to the display. This ensures that optimum image quality is maintained on a display that experiences changing ambient light conditions.

FIG. 1 illustrates a display in the form of a mobile phone display 110 showing hardware and software components relative to an embodiment of the present invention. The present invention automatically adjusts the color gamut of a display to ensure optimum image quality under different ambient light conditions. There are a variety of reasons why a display can experience a change in ambient light. A change in ambient light can result from a mobile phone user walking indoors on a sunny day and vice-versa. An ambient light may also change while indoors after a light is dimmed or turned off.

A mobile phone 100 includes several hardware and software components. The hardware components can include a display 110, a light sensor 120, a camera 130, and a microprocessor 180. The microprocessor is capable of graphics processing and includes relevant display drivers and the like. The display 110 can include LCDs (monochrome, TFTs, STNs, etc.), Plasmas, and CRTs. The light sensor 120 can be of a pulse type having a preset pulse interval or a continuous type with an adjustable sampling rate. The camera 130 can capture still or moving images.

The software components within the mobile phone 100 that pertain to the present invention include an adjustment algorithm 140, look-up tables 150 and 160, and display characteristic data 170. The adjustment algorithm 140 executes in the background with the aid of a microprocessor 180. The adjustment algorithm 140 also interacts with the light sensor 120, the look-up tables 150 and 160, the display 110, and the microprocessor 180. The look-up tables 150 and 160 are comprised of a spectrum of color gamut data that correspond to ambient light conditions. For example, one color gamut can correspond to a sunny day, while another corresponds to a dimly-lit room, and yet another corresponds to a brightly lit room, and so on. A database of reference media files and color gamut data 190 can also be included.

FIG. 2 is a flowchart for automatically adjusting a display color gamut to compensate for an ambient light change. A media file is displayed in block 210. The media file can include, but is not limited to, a picture file (.JPG, .GIF, .TIFF, etc) or a video file (.Mov, . MPEG, .AVI, .WMV, etc).

Media files can be created internally or imported from an external source. Referring back to FIG. 1, the camera 130 can be used to create a media file internally. If the media file is saved, it can be later viewed on mobile display 110. An external source encompasses media files that were not created by the device on which it is displayed. This includes, for example, media files that were received in a message (MMS, e-mail, etc), stored on a removable media, or a media file that was downloaded via an Internet site or received from another device.

Referring again to FIG. 2, after a media file is displayed in block 210, the light sensor senses the ambient light 220. The light sensor can be positioned such that it experiences as close to the same light as the display. The light sensor can be set to automatically sense light whenever the display is in use. For example, if the device is a "flip-type" mobile phone, the light sensor can be set to automatically sense light when the phone is flipped open, i.e. when the display is exposed to the ambient light. After sensing, the light sensor interacts with the microprocessor to convert the received light into a stream of digital data (hereinafter ambient light data).

The method 200 then forwards the ambient light data, in block 230, to an adjustment algorithm. The light sensor can be set to continuously or periodically forward ambient light data to the adjustment algorithm. The adjustment algorithm process the ambient light data in conjunction with the look-up tables or database of reference media files and color gamut data 190 to determine replacement color gamut data that maintains image quality under the current ambient light for the display.

The adjustment algorithm, in block 240, receives the ambient light data from the light sensor. The ambient light data may be stored in a self-purging buffer (or the like) within the adjustment algorithm. The self-purging buffer can help minimize the requisite cache memory within the device. After receiving the ambient light data the adjustment algorithm determines whether a replacement color gamut is preferable. Replacement color gamut data is preferable when the difference between the current ambient light data and the last used ambient light data exceeds a threshold value. The sensitivity of the adjustment algorithm can be adjusted by changing the threshold value. For example, to conserve power consumption, a user may configure a threshold value that requires a relatively large difference between the current ambient light data and the last used ambient light data before determining whether a replacement color gamut is preferable.

If the adjustment algorithm does not determine that a replacement color gamut is preferable, then the process proceeds to block 295 and waits for a more significant change in ambient light conditions. If the adjustment algorithm determines that a replacement color gamut is preferable, the adjustment algorithm automatically, in block 250, requests replacement color gamut data from the look-up table 260. In requesting replacement color gamut data, the adjustment algorithm will forward to the look-up table 260 the current ambient light data. The look-up table 260 indexes to a replacement color gamut based on ambient light data. Media file properties such as bit depth and pixels/inch, etc. . . . as well as the display properties are constants that have already been factored into the look-up table data.

After receiving the request, the look-up table locates more preferable color gamut data and forwards the replacement color gamut data back to the adjustment algorithm 270. The adjustment algorithm, in block 280, then compiles a display correction based on the replacement color gamut and new preset value. In block 290, the display correction is automatically applied to the display. The light sensor continuously monitors for changes in the ambient light. Upon detecting a change in the ambient light, the control will automatically revert to block 220 and the process is repeated. The user may configure a threshold for determining how much the ambient light data should change to trigger a reversion to block 220. If the light sensor does not detect a threshold change in the ambient light, no further activity will occur.

Referring now to FIG. 3 a method 300 for creating a look-up table for a media file that was not created by the device is shown. Here, a user selects a media file to view on the display in step 310. After selecting a media file, block 320 determines whether there is a preexisting look-up table for the selected media file. A preexisting look-up table can exist where, for example, the media file was previously displayed on the device. In block 320, if there is a preexisting look-up table for the media file, the adjustment algorithm will use that look-up table. If there is not a preexisting look-up table, the adjustment algorithm proceeds to block 340 where the ambient light data is processed with the display properties of the device and properties of the media file. The display properties include the physical and optical capabilities of the display such as resolution, color bit depth, etc.

Generally, the properties of a media file can include information such as pixel/inch and color bit depth. After the ambient light data is processed with the display properties in block 340, the properties of the media file are processed, in block 350. This can assist in determining the range of wavelengths that can accurately be displayed for the selected media file. In block 360, the color gamut data look-up table for the media file is created for the media file that is currently on display. The look-up table includes a spectrum of color gamut data associated with differing ambient light data.

Referring now to FIG. 4, a method 400 for creating a look-up table for a media file that was created by the device is shown. In block 410, the light sensor senses the ambient light conditions. In block 420, the user utilizes the camera to create a media file. After capturing and reviewing the media file, in block 430, the user determines whether to keep the file. If the user decides to store the file then the original light sensor data is integrated and included with media file. In block 460, the light sensor data is processed with the display properties of the device. After the ambient light data is processed with the display properties in block 460, the properties of the media file are processed, in block 470. In block 480, the color gamut data look-up table for the media file is created for the newly created media file.

If the user does not store the file as determined, in block 430, then in block 440 the user can determine whether to capture and create another media file. If the user decides to capture and create another media file, then the method 400 reverts to block 420. If the user does not decide to capture and create another media file, then in block 450 no further activity will occur.

FIG. 5 is a flowchart for adjusting a display color gamut for one media file using a database 190 of pre-stored color gamut data for a similar reference media file. In this embodiment, the user will adjust the color gamut settings for a desired media file by using the settings for a comparable reference media file. In block 510, the user selects from among several reference media files stored within the display device. The reference media files are intended to approximate many subjects such as landscapes, portraits, action, objects, etc. Moreover, each reference media file has a plurality of color gamut settings to choose from. Each color gamut setting is intended to approximate a different ambient light setting. The ambient light settings for each reference media file can include, but are not limited to, low or dim light, bright light, indoor artificial light, average light, etc.

In block 520, the user will scroll through the various ambient light settings for the chosen reference media file. In block 530, the user decides if he is satisfied with the reference media file with the ambient light setting as it currently appears. If not, the user returns to block 520 to select a different ambient light setting for the reference media file. Once the user is satisfied with the image of the reference media file under current conditions, the color gamut data associated with the reference media file and selected ambient light settings is applied to the original media file the user wishes to display.

Although the present invention has been shown and described in considerable detail with respect to an exemplary embodiment of the invention, it should be understood by those skilled in the art that it is not intended to limit the invention to specific embodiments disclosed. Various modifications, omissions, and additions may be made to the disclosed embodiments without materially departing from the novel teachings and advantages of the invention, particularly in light of the foregoing teachings.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for adjusting color gamut data associated with a digital media file to compensate for changing ambient light conditions at a display screen when displaying the media file on the display screen, the method comprising:
    detecting ambient light conditions at the display screen;
    converting the ambient light conditions to ambient light data;
    comparing the ambient light data to previous ambient light data to determine a difference value;
    in response to determining the difference value exceeds a threshold, determining whether a pre-existing color gamut look-up table exists for the digital media file, where a pre-existing color gamut look-up table exists if the digital media file was previously displayed on the display screen;
    in response to determining a pre-existing color gamut look-up table exists for the digital media file:
        selecting alternate color gamut data from the pre-existing color gamut look-up table that contains optimized color gamut data for a variety of ambient light data associated with the digital media file, wherein alternate color gamut data is selected according to the ambient light data;
        determining a replacement color gamut to apply to the display based on the alternate color gamut data; and
        applying the replacement color gamut to the display to adjust the display to compensate for changing ambient lighting conditions.

2. The method of claim 1 further comprising periodically re-detecting the ambient light conditions at the display screen so that any change in the ambient light conditions can be re-processed to update a rendition of the digital media file as it is displayed on the display screen to reflect a change in the ambient light conditions.

3. A mobile phone having a display screen that can optimize the rendition of a digital media file on the display screen based on changing ambient light conditions at the display screen, the mobile phone comprising:
    a display screen;
    a light sensor proximate to the display screen such that the light sensor can detect ambient light conditions at the display screen;
    a processor within the mobile phone for:
        receiving and converting the detected ambient light conditions to ambient light data;
        comparing ambient light data to previous ambient light data to determine a difference;
        in response to determining the difference value exceeds a threshold, determining whether a pre-existing color gamut look-up table exists for the digital media file, where a pre-existing color gamut look-up table exists if the digital media file was previously displayed on the display screen;
        in response to determining a pre-existing color gamut look-up table exists for the digital media file:
            selecting alternate color gamut data from the pre-existing color gamut look-up table that contains optimized color gamut data for a variety of ambient light data associated with the digital media file, wherein alternate color gamut data is selected according to the ambient light data;
            determining a replacement color gamut to apply to the display based on the alternate color gamut data; and
            applying the replacement color gamut to the display to adjust the display to compensate for changing ambient lighting conditions.

4. A device connectable to a display screen that can optimize the rendition of a digital media file on the display screen based on changing ambient light conditions at the display screen, the device comprising:
    a light sensor proximate to the display screen such that the light sensor can detect ambient light conditions at the display screen;
    a processor within the device for:
        receiving and converting the detected ambient light conditions to ambient light data;
        comparing ambient light data to previous ambient light data to determine a difference value;
        in response to determining the difference value exceeds a threshold, determining whether a pre-existing color gamut look-up table exists for the digital media file, where a pre-existing color gamut look-up table exists if the digital media file was previously displayed on the display screen;
        in response to determining a pre-existing color gamut look-up table exists for the digital media file:
            selecting alternate color gamut data from the pre-existing color gamut look-up table that contains optimized color gamut data for a variety of ambient light data associated with the digital media file, wherein alternate color gamut data is selected according to the ambient light data;
            determining a replacement color gamut to apply to the display based on the alternate color gamut data; and
            applying the replacement color gamut to the display to adjust the display to compensate for changing ambient lighting conditions.

5. A computer program product embodied on a non-transitory computer readable medium for adjusting color gamut data associated with a digital media file to compensate for changing ambient light conditions at a display screen when displaying the media file on the display screen, the computer program product comprising:
    computer program code for detecting ambient light conditions at the display screen;
    computer program code for converting the ambient light conditions to ambient light data;
    computer program code for comparing the ambient light data to previous ambient light data to determine a difference value;
    computer program code for, in response to determining the difference value exceeds a threshold, determining whether a pre-existing color gamut look-up table exists for the digital media file, where a pre-existing color gamut look-up table exists if the digital media file was previously displayed on the display screen;

computer program code for, in response to determining a pre-existing color gamut look-up table exists for the digital media file:
  selecting alternate color gamut data from the pre-existing color gamut look-up table that contains optimized color gamut data for a variety of ambient light data associated with the digital media file, wherein alternate color gamut data is selected according to the ambient light data;
  determining a replacement color gamut to apply to the display based on the alternate color gamut data; and
  applying the replacement color gamut to the display to adjust the display to compensate for changing ambient lighting conditions.

6. The computer program product of claim 5 further comprising computer program code for periodically re-detecting the ambient light conditions at the display screen so that any change in the ambient light conditions can be re-processed to update a rendition of the digital media file as it is displayed on the display screen to reflect a change in the ambient light conditions.

7. A method for adjusting color gamut data associated with a digital media file to compensate for changing ambient light conditions at a display screen when displaying the media file on the display screen, the method comprising:
  detecting ambient light conditions at the display screen;
  converting the ambient light conditions to ambient light data
  comparing the ambient light data to previous ambient light data to determine a difference value;
  in response to determining the difference value exceeds a threshold, determining whether a pre-existing color gamut look-up table exists for the digital media file, where a pre-existing color gamut look-up table exists if the digital media file was previously displayed on the display screen;
  in response to determining a pre-existing color gamut look-up table does not exist for the digital media file:
    displaying a reference media file similar to the digital media file;
    selecting an ambient light condition having distinct color gamut data for the reference media file that provides a desired view of the reference media file;
    re-displaying the reference media file applying the color gamut data for the selected ambient light condition to verify that the selected ambient light condition provides the desired view of the reference media file; and
    selecting the color gamut data associated with the reference media file and applying the selected color gamut data to the digital media file.

8. A mobile phone having a display screen that can optimize the rendition of a digital media file on the display screen, the mobile phone comprising:
  a display screen;
  a light sensor proximate to the display screen such that the light sensor can detect ambient light conditions at the display screen;
  a reference media file database that contains optimized color gamut data pertaining to a plurality of reference media files for a variety of ambient light data; and
  a processor configured to:
    detect ambient light conditions at the display screen;
    convert the ambient light conditions to ambient light data
    compare the ambient light data to previous ambient light data to determine a difference value;
    in response to determining the difference value exceeds a threshold, determine whether a pre-existing color gamut look-up table exists for the digital media file, where a pre-existing color gamut look-up table exists if the digital media file was previously displayed on the display screen;
    in response to determining a pre-existing color gamut look-up table does not exist for the digital media file:
      display a reference media file similar to the digital media file;
      select an ambient light condition having distinct color gamut data for the reference media file that provides a desired view of the reference media file;
      re-display the reference media file applying the color gamut data for the selected ambient light condition to verify that the selected ambient light condition provides the desired view of the reference media file; and
      select the color gamut data associated with the reference media file and applying the selected color gamut data to the digital media file.

9. A computer program product embodied on a non-transitory computer readable medium for adjusting color gamut data associated with a digital media file to compensate for changing ambient light conditions at a display screen when displaying the media file on the display screen, the computer program product comprising:
  computer program code for detecting ambient light conditions at the display screen;
  computer program code for converting the ambient light conditions to ambient light data;
  computer program code for comparing the ambient light data to previous ambient light data to determine a difference value;
  computer program code for, in response to determining the difference value exceeds a threshold, determining whether a pre-existing color gamut look-up table exists for the digital media file, where a pre-existing color gamut look-up table exists if the digital media file was previously displayed on the display screen;
  computer program code for in response to determining a pre-existing color gamut look-up table does not exist for the digital media file:
    displaying a reference media file similar to the digital media file;
    selecting an ambient light condition having distinct color gamut data for the reference media file that provides a desired view of the reference media file;
    re-displaying the reference media file applying the color gamut data for the selected ambient light condition to verify that the selected ambient light condition provides the desired view of the reference media file; and
    selecting the color gamut data associated with the reference media file and applying the selected color gamut data to the digital media file.

10. The method of claim 1 wherein the properties of the digital media file include at least one of color bit depth and pixels/inch, and wherein the display properties include a resolution of the display screen.

11. The method of claim 1, further comprising:
  in response to determining a pre-existing color gamut look-up table does not exist for the digital media file:
    processing the ambient light data with display properties of the display screen;

after processing the ambient light data with the display properties of the display screen, processing the ambient light data with properties of the digital media file; and creating a color gamut data look-up table for the digital media file.

12. The mobile phone of claim 3, further comprising:

the processor for:

in response to determining a pre-existing color gamut look-up table does not exist for the digital media file:

processing the ambient light data with display properties of the display screen;

after processing the ambient light data with the display properties of the display screen, processing the ambient light data with properties of the digital media file; and creating a color gamut data look-up table for the digital media file.

13. The device of claim 4, further comprising:

the processor for:

in response to determining a pre-existing color gamut look-up table does not exist for the digital media file:

processing the ambient light data with display properties of the display screen;

after processing the ambient light data with the display properties of the display screen, processing the ambient light data with properties of the digital media file; and creating a color gamut data look-up table for the digital media file.

14. The computer program product of claim 5, further comprising:

computer program code for, in response to determining a pre-existing color gamut look-up table does not exist for the digital media file:

processing the ambient light data with display properties of the display screen;

after processing the ambient light data with the display properties of the display screen, processing the ambient light data with properties of the digital media file; and creating a color gamut data look-up table for the digital media file.

15. The method of claim 7, further comprising:

in response to determining a pre-existing color gamut look-up table exists for the digital media file:

selecting alternate color gamut data from the pre-existing color gamut look-up table that contains optimized color gamut data for a variety of ambient light data associated with the digital media file, wherein alternate color gamut data is selected according to the ambient light data;

determining a replacement color gamut to apply to the display based on the alternate color gamut data; and applying the replacement color gamut to the display to adjust the display to compensate for changing ambient lighting conditions.

16. The mobile phone of claim 8, wherein the processor is further configured to in response to determining a pre-existing color gamut look-up table exists for the digital media file:

select alternate color gamut data from the pre-existing color gamut look-up table that contains optimized color gamut data for a variety of ambient light data associated with the digital media file, wherein alternate color gamut data is selected according to the ambient light data;

determine a replacement color gamut to apply to the display based on the alternate color gamut data; and apply the replacement color gamut to the display to adjust the display to compensate for changing ambient lighting conditions.

17. The computer program product of claim 9, further comprising:

computer program code for, in response to determining a pre-existing color gamut look-up table exists for the digital media file:

selecting alternate color gamut data from the pre-existing color gamut look-up table that contains optimized color gamut data for a variety of ambient light data associated with the digital media file, wherein alternate color gamut data is selected according to the ambient light data;

determining a replacement color gamut to apply to the display based on the alternate color gamut data; and applying the replacement color gamut to the display to adjust the display to compensate for changing ambient lighting conditions.

18. The method of claim 1, wherein the pre-existing color gamut look-up table is not associated with the display screen.

19. The mobile phone of claim 3, where the mobile phone allows a user of the mobile phone to determine whether to store the digital media file, and wherein the mobile phone, in response to the user selecting an option to store the digital media file, integrates original light sensor data into the digital media file.

20. The mobile phone of claim 3, further comprising:

a self-purging buffer that stores ambient light data.

* * * * *

UNITED STATES PATENT AND TRADEMARK OFFICE
CERTIFICATE OF CORRECTION

| | |
|---|---|
| PATENT NO. | : 8,130,235 B2 |
| APPLICATION NO. | : 11/306171 |
| DATED | : March 6, 2012 |
| INVENTOR(S) | : Walter Marcinkiewicz |

It is certified that error appears in the above-identified patent and that said Letters Patent is hereby corrected as shown below:

Column 7, line 64, after "difference" insert --value--.

Signed and Sealed this
Seventeenth Day of April, 2012

David J. Kappos
*Director of the United States Patent and Trademark Office*